Nov. 29, 1966  E. P. REAGAN ETAL  3,288,102
DEVICE FOR SPRAYING BEVERAGE CASES
Filed Oct. 28, 1963  3 Sheets-Sheet 1

INVENTOR
FRANK E. REED
EUGENE P. REAGAN, DECEASED,
BY EILEEN S. REAGAN, ADMINISTRATRIX
BY John W. Adams
ATTORNEY

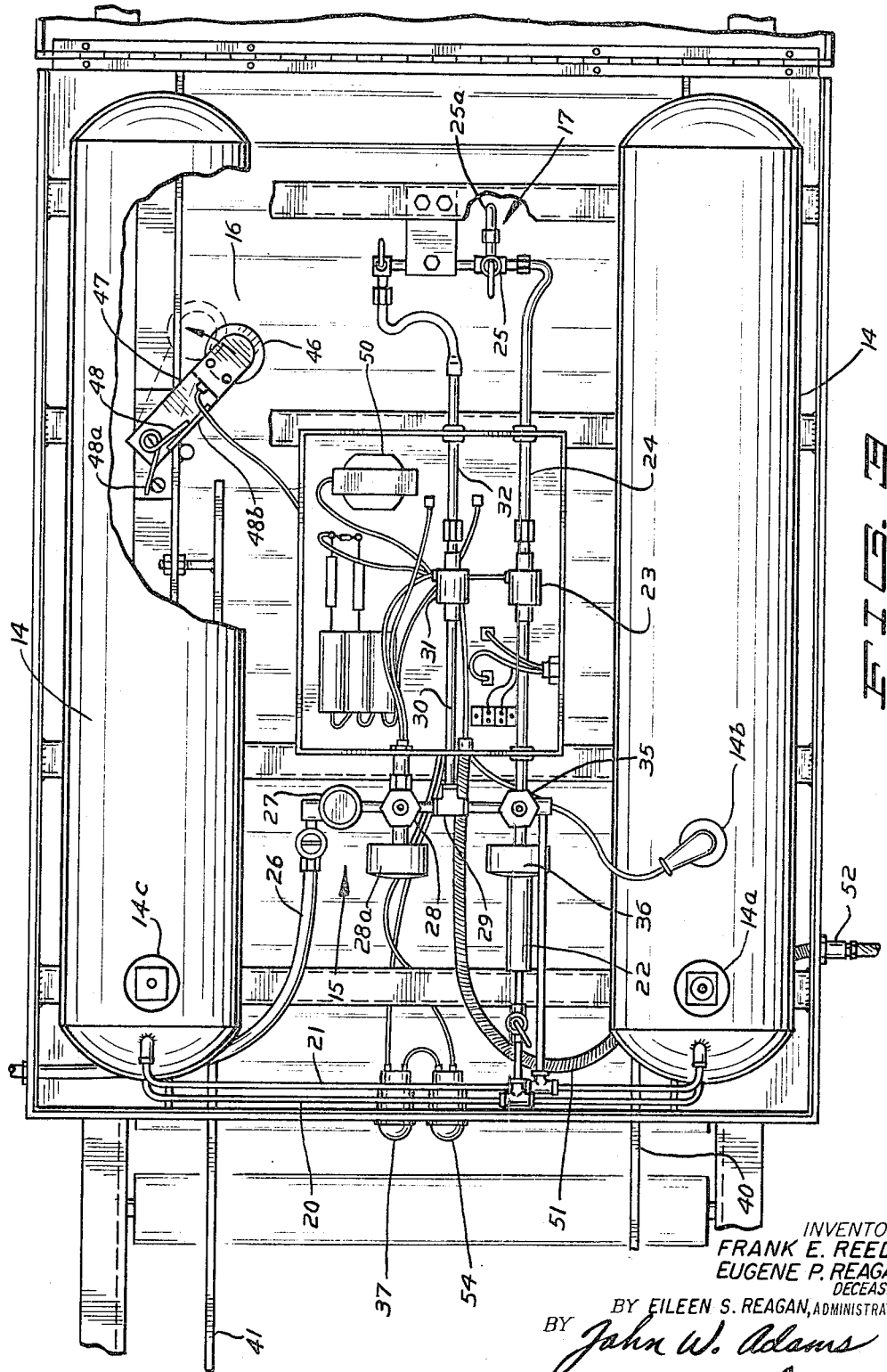

Nov. 29, 1966   E. P. REAGAN ETAL   3,288,102
DEVICE FOR SPRAYING BEVERAGE CASES
Filed Oct. 28, 1963   3 Sheets-Sheet 3
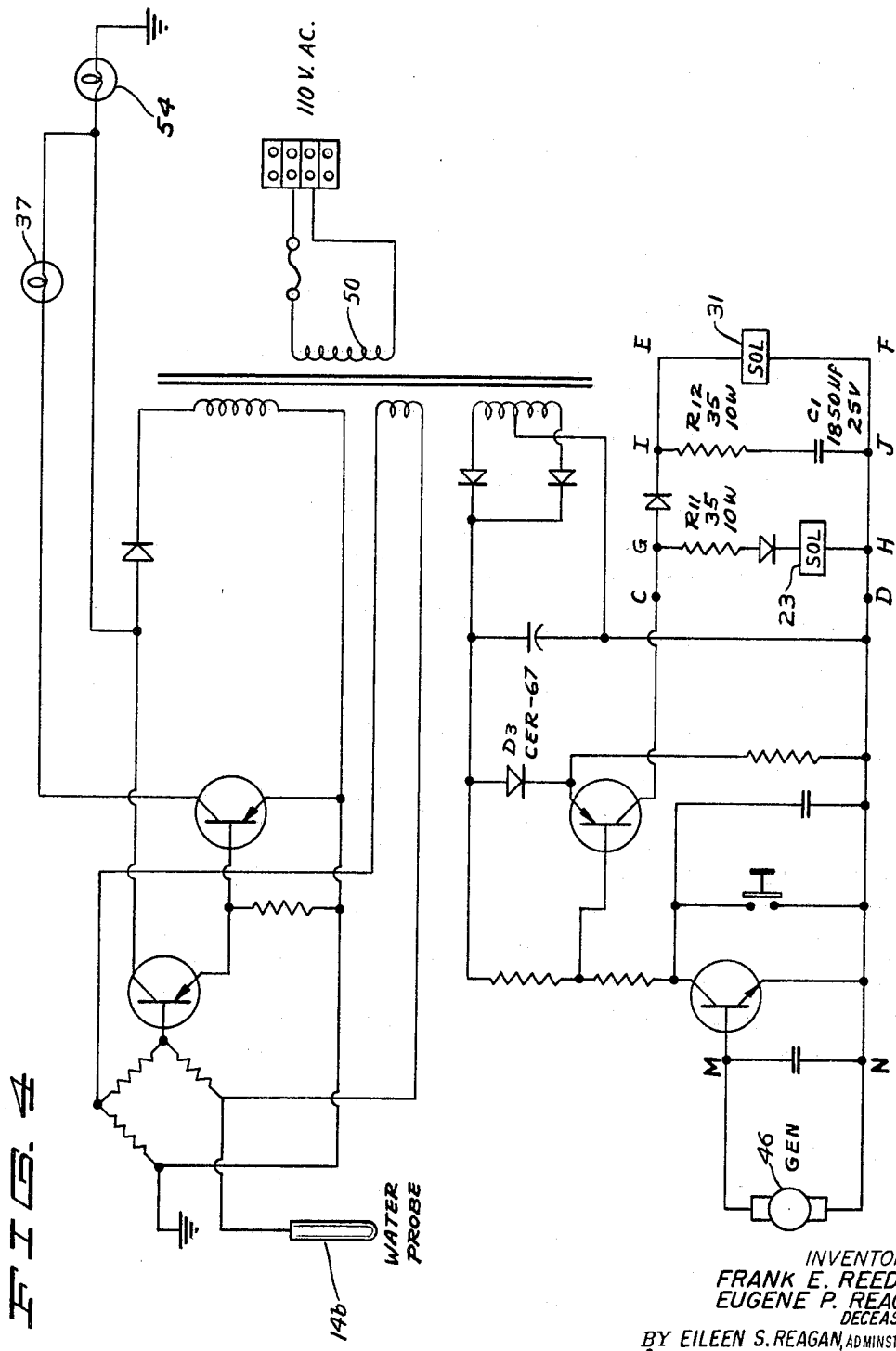
INVENTOR
FRANK E. REED
EUGENE P. REAGAN,
DECEASED.
BY EILEEN S. REAGAN, ADMINSTRATRIX
BY *John W. Adams*
ATTORNEY United States Patent Office 3,288,102
Patented Nov. 29, 1966

3,288,102
DEVICE FOR SPRAYING BEVERAGE CASES
Eugene P. Reagan, deceased, late of Minneapolis, Minn., by Eileen S. Reagan, administratrix, Minneapolis, and Frank E. Reed, Jr., Minneapolis, Minn., assignors to Summit Chemical Company, Baltimore, Md., a partnership
Filed Oct. 28, 1963, Ser. No. 319,600
5 Claims. (Cl. 118—2)

This invention relates generally to spraying apparatus and more particularly to a beverage case conditioner designed to spray cases with a predetermined amount of insect repellent.

The advent and growth of the beverage business has produced many problems for the manufacturer or brewer. In distributing his product the case lot has been the most effective and economical arrangement conceived. However, through use and through the necessity of storing cases until they may be picked up and returned to the brewer the cases are subject to contamination by various forms of vermin and the like. In order to provide a sanitary manufacturing plant, it is necessary to prevent the admittance of such vermin into the plant by being delivered thereto as the cases are returned to the plant. The manufacturers and users of returnable cases have sought many types of disinfectants and methods of applying them to cases such that vermin and the like will not be attracted thereto and returned to the plant with the case. As many of the cases are made from fiber materials, it is not practical to dip the cases in an insect repelling solution due to weakening of the case material. It has rather become desirable to spray the cases with the desired disinfecting solution. However, individually spraying each case is not economically feasible due to the time required for spraying and due to the waste when the disinfectant is manually sprayed.

Applicant however has provided a case spraying mechanism which is specifically designed to economically and effectively spray insect repellent and the like upon and into cases as they are conveyed therepast, by providing a uniform spray and eliminating any manual operations in spraying. To speed production most beverage bottlers have conveyorized their production facilities. Various units which are available to spray cases and even those which may be adaptable to spray cases employ a sensing element to initially sense the presence of the article to be sprayed and to control the spraying thereof. However, most of these sensing elements are responsive only to the presence of the article to be sprayed and thereby will spray until the article has been removed from the actuating area. For instance, a micro switch will remain tripped until the article has passed from contact therewith.

Applicant however has provided a spraying apparatus which although specifically designed for spraying beverage cases and the like, and which will be described herein for this specific application, would be adaptable to spray many other articles which are conveyed past the spraying mechanism.

In applicant's spray mechanism a new and unique mechanism actuated only by the movement of the article to be sprayed has been provided such that should the article stop in the spray area, the spray will likewise be halted until the article's motion is again commenced.

Applicant has further provided a spraying mechanism in which air is mixed with the fluid at the nozzle head and in which the spray sequence starts by forcing air through the nozzle, adding the fluid to be sprayed to combine with air passing through the nozzle; stopping the flow of fluid to the nozzle and continuing the flow of air to the nozzle for a period which would insure complete drainage of all fluid from the nozzle. This spraying sequence insured complete atomization of the fluid and prevents dripping of the fluid from the nozzle.

The sensing element to control the complete spraying operation in applicant's invention is primarily an electrical generator which is aligned with and held in driving contact with the articles passing thereby such that should the articles stop the electrical impulse generated by the generator will also stop and the spraying sequence will be halted at this point such that no case is sprayed when it is not moving.

It is therefore an object of applicant's invention to provide a spraying mechanism for conveyed articles such as beverage cases such that the spraying sequence will be initiated when one of the articles reaches and actuates a sensing element and will be stopped immediately upon the passage of the article entirely therepast.

It is a further object of applicant's invention to provide a beverage case conditioner designed to spray an insect repelling fluid on beverage cases and the like wherein the spray is controlled by the motion of the case being conveyed therepast.

It is a further object of applicant's invention to provide a spray mechanism responsive to a motion sensing element wherein the sense element is actuated only in response to movement of an article therepast and wherein the spray apparatus will be immediately shut off should the motion of the article being sprayed be stopped.

It is a specific object of applicant's invention to provide a beverage case conditioner wherein a spray fluid is provided and wherein a pressurized air supply serves as the pressurizing and spraying medium to insure complete atomization of the spray fluid such that the same will be uniformly directed over the article being sprayed.

These and other objects and advantages of my invention will more fully appear from the following description made in connection with the accompanying drawing, wherein like reference characters refer to the same or similar parts throughout the several views, and in which:

FIG. 3 is an enlarged plane view of the cabinet with the cover removed and with portions thereof broken away;

FIG. 4 is an electrical schematic showing the control circuitry device.

Figure 1:
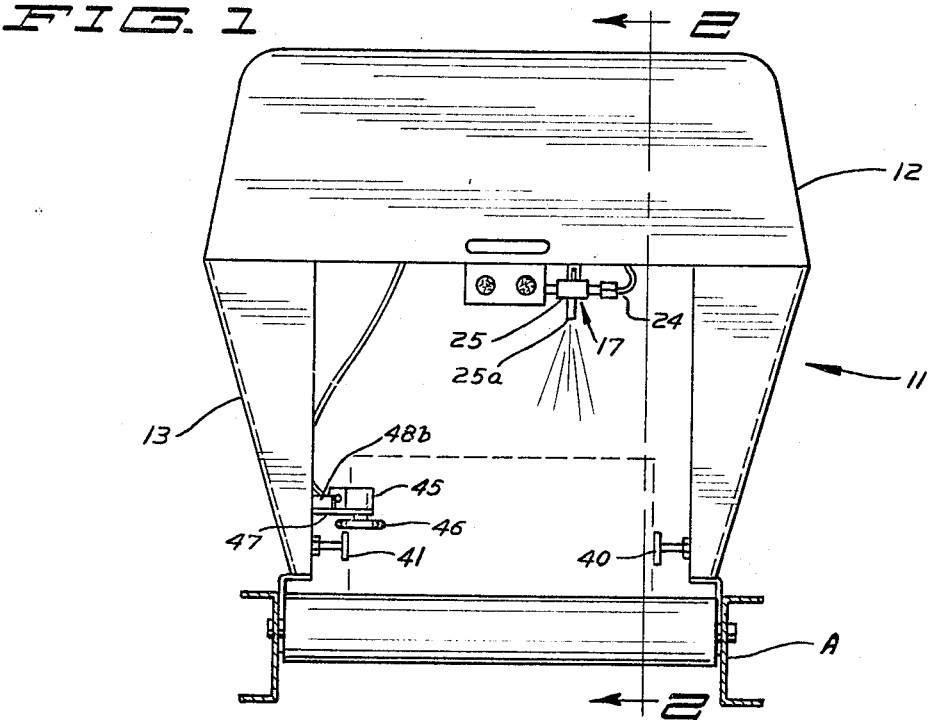
FIG. 1 is an elevation taken from one end of the cabinet as mounted on a conveyor section.
Figure 2:
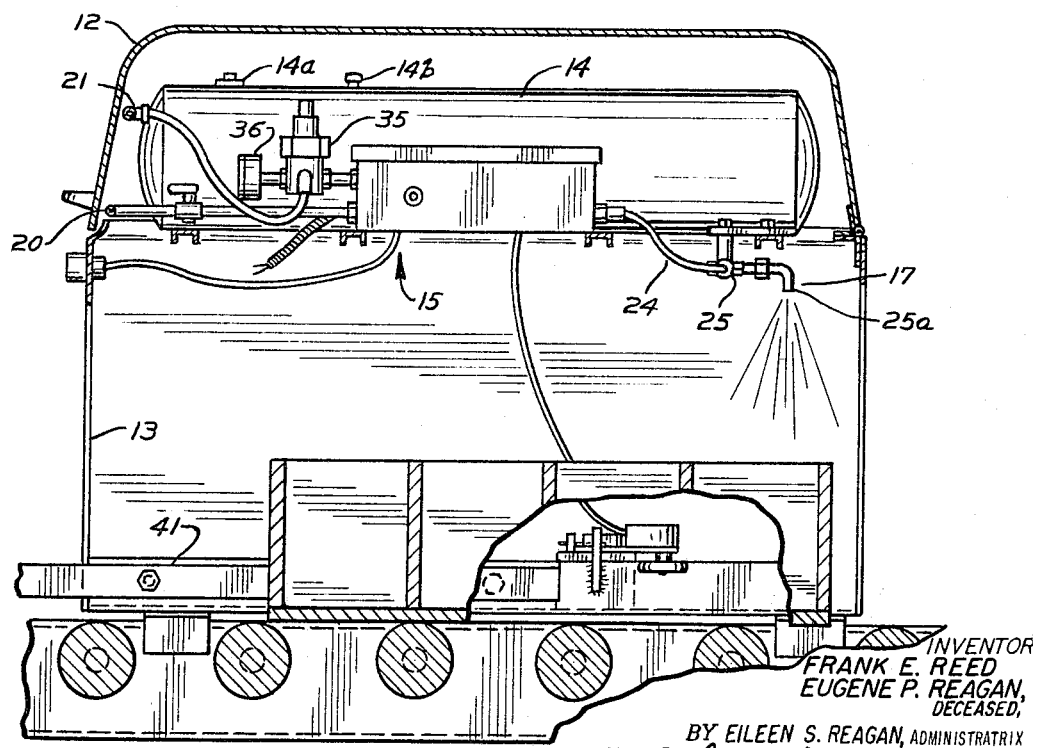
FIG. 2 is a vertical section taken substantially along line 2—2 of FIG. 1.

In accordance with the accompanying drawing applicant's beverage case conditioner comprises a covered cabinet generally designated 11 in which the top 12 is hingedly attached to a supporting side and leg section 13 adopted for mounting on a conveyor. The internal elements of the conditioner are illustrated in FIG. 3 and include a fluid supply section comprising a pair of tanks 14—14, a main control unit designated 15, a sensing unit designated 16 and a spray head section designated 17. In the form shown the entire control mechanism 15, the tank section 14 and spray head section 17 are supported by the cabinet 11 in spaced vertical relation above a conveyor unit illustrated in the figures and designated A. The fluid tank units 14—14 are connected in parallel by a pair of conduits, one conduit 20 receiving fluid from the lower portion of the tanks 14—14 and the other conduit 21 arranged to provide air pressure to the top of the tanks 14—14. Conduit 20 is arranged to pass through a strainer member 22 and is directed into the control section 15 where the fluid flow therethrough is controlled by an in line solenoid valve member designated 23. Outlet from valve 23 is conveyed by conduit 24 to the spray nozzle mixing head designated 25 which is arranged to spray downwardly such that it will spray fluid over the conveyor section A therebelow.

The air line 21 is provided with air from an outside pressure source through conduit 26 which introduces the air to an air strainer 27 and to a main control valve 28 which regulates and controls the pressure of air admitted to the control system 15. A gauge 28a is provided on case 28 for precisely controlling the pressure. The now controlled air is directed by a T fitting 29 into two separate conduits, one of which is designated 30 passes into the control section 15 where it is positively covered by a second in line solenoid valve designated 31. Outlet 32 from solenoid valve 31 passes from the control section 15 into the nozzle mixing head 25 for delivery out of the nozzle discharge opening 25a. Air passing through this line 30 and controlled by solenoid valve 31 is in the range from 12 to 20 p.s.i. The other air delivered from the T section 29 passes through a second control valve designated 35 again provided with a gauge 36 thereon such that the same may be precisely controlled. The air directed from this valve 35 is directed through conduit 21 to act upon the fluid supply in fluid tanks 14—14 at the upper surface thereof to force the fluid from the tanks 14—14. The pressure of this line 21 is approximately 3 to 5 p.s.i. By providing air pressure on the upper fluid surface the fluid will be forced from the supply tanks 14—14 and no auxiliary pumping system will be required.

The reason for the two air valves 28 and 35 and gauges 28a and 36 is that it is not necessary to provide high pressure upon the fluid surface to pump the same but high pressure is required at the spray nozzle 25a to completely atomize the fluid delivered thereto.

A safety valve designated 14a is provided on one of the fluid supply tanks 14 such that should the pressure become too great therein the valve will provide pressure release therefore. A level sensing mechanism designated 14b is also provided on one of the fluid supply tanks 14 and activates a warning light designated 37 on one end of the cabinet such that the operator will know when the fluid supply is dangerously low.

The air and fluid pumping system is provided with separate lines controlled respectively by the individual in line solenoid valves designated 23 and 31. The purpose of the dual system is to provide air flow through the nozzle before fluid is directed thereto. Therefore, by opening solenoid 31 and after a slight delay opening solenoid 23 the air will be emitted from the nozzle 25a prior to the fluid. When stopping the supply the procedure is reversed in that the fluid flow is shut off before the air pressure is shut off. This procedure allows the air to completely blow out any fluid left in the nozzle 25a such that the same will not drip.

The solenoids 23–31 are described as in line magnetic solenoids. Various magnetic solenoids are available and are well known in the art. However, most of these provide a conduit having the closure member of the valve sealing the conduit from the side. The magnet in this type of valve is mounted normal to the conduit and circumscribes the closure member to pull the closure member out of sealing registration when a field is provided. However, these solenoids do not allow for compact design in that they extend radially outward from the conduit. The valves used by applicant are provided with a toroidal magnet circumscribing the conduit wherein the closure member is spring loaded against a valve seat spaced longitudinally from the center of the magnet and upon applying a current to the magnet the closure member is drawn longitudinally through the conduit such that fluid may pass therearound and through the valve seat.

A pair of article guiding rails designated respectively 40–41 are arranged in opposed relation on the upper run of conveyor A to positively guide cases directly under the spray emitted by nozzle 25a. These guide rails are of course adjustable depending on the width of the case being conveyed therethrough.

The activating and sensing mechanism 16 which controls the operation of solenoid valves 23 and 31 is disposed in interfering position above the conveyor A such that it will be activated by an article being conveyed therepast as illustrated in FIG. 1. The sensing and control mechanism includes a low voltage generator designated 45 having a friction drive wheel 46 on the drive shaft thereof and in which the generator 45 is fixedly attached to a pivotally mounted bracket 47 attached to the housing 11. The bracket as illustrated in FIG. 3 is maintained in position such that the drive wheel 46 will contact articles carried therepast by a spring loading mechanism designated 48 which has its ends respectively abutting a stop pin 48a and a stop shoulder 48b. In this manner the generator is shiftable according to the width of the article moving therepast to be in friction driving contact with the article. The generator 45 will operate at a relatively low speed such as approximately 45 r.p.m. which corresponds to approximately 15 feet per second of an article conveyed therepast. For safety reasons due to the presence of fluid the range of output of the generator is approximately 1 to 1.5 volts.

The generator 45 used as a sensing unit of course provides the actuating factor to the circuitry of the control mechanism 15 which circuit will be described hereafter. It should be noted however that the generator 45 will only develop this signal when the friction drive tire 46 is rotated which of course will only occur when an article is conveyed therepast with the wheel 46 contacting the surface thereof.

The possibility of expanding the use of such a generator in other systems requiring precise timing should be obvious of course. This generator 45 could be adapted for use on any sort of machine such as a packaging machine which required precise timing in order to perform an act upon a moving article.

The generator 45 must be operable in this application at a low r.p.m. and still supply sufficient current to activate the valve 23–31 elements of the air and fluid conduits.

The control circuitry of the system is illustrated in FIG. 4 wherein the input to the transformer 50 is brought into the cabinet from the electrical conduit 51 having connection 52 on the side of the cabinet. The 110 volt input is transformed and rectified such that a 22 volt D.C. input is maintained on the control circuit of the spray mechanism as illustrated in the schematic of the control system. The output of the generator 46 is the actuating signal of the circuit while the actual time delay of the circuit is obtained at the right hand side of the schematic wherein the liquid solenoid valve 23 and the air solenoid valve 31 are contained. The flow of current, during this parallel arrangement as indicated by points C and D, will be described. Current flowing therepast in response to the generator signal will open the air solenoid 31 immediately as no resistance appears in line EF. However, the resistance designated R11 in the liquid solenoid valve 23 line designated GH will provide a delay in opening the liquid solenoid valve 23. This of course allows air to pass through the conduit 32 into nozzle 25a prior to the admittance of liquid to the nozzle 25a. When the signal ceases as a result of the rotation of the generator being stopped the branch of the circuit designated IJ containing capacitor C will discharge through line EF containing air solenoid valve 31. This capacitance discharge will cause a delay in the closing of solenoid 31 while the liquid solenoid valve 23 closes immediately upon cessation of the current flow.

The upper portion of the circuit is provided with approximately 16 volts from the transformer 50. This portion of the circuit is primarily a leveling sensing circuit and a power indicator circuit. As stated previously lamp 37 indicates the level of fluid in tank 14 in response to probe designated 14b which is a commercially available probe which measures the conductivity of the medium in which it is emersed, in this case being either water or air. The power indicator lamp 54 purely indicates whether the power is off or on.

In operation of this spray cabinet 11 the unit is mounted on a conveyor section A preferably at a point where the cases delivered thereto are driven under power and where the cases are empty and open. The flow of cases through the unit should be from the side showing the control lights 37-54 to exit below the spray nozzle section 17. This of course puts the cases in the proper flow past the generator sensing section 16. A 110 volt supply must be provided and compressed air must be provided to inlet air conduit 26. The maximum air required in this installation is approximately 3 c.f.m and 30 p.s.i. The tanks 14—14 are filled through tank inlet 14c and during filling, time must be allowed for the liquid level to balance between the tanks. Although many insect repellants are available, a commercial repellent such as MGK Repellent #874 has been found to be very effective. The guide bar 40 is adjusted to accommodate the width of a case being processed, to align the cases such that they will contact the drive wheel 46 of generator 45 to frictionally drive the same. The air regulators are then adjusted; the primary regulator 28 at approximately 20 p.s.i. and the secondary regulator 35 at approximately 4 p.s.i. The operating pressure reading on the primary gauge 28 will drop slightly below that of the static reading to be that of approximately 15 p.s.i. With this air setting, on a 40 f.p.m. conveyor the unit will spray approximately 2 cc. per case. The unit is now ready for operation as soon as the power to the circuit has been turned on.

As cases move through the cabinet the side of the case will contact the generator wheel 46 energizing the spray circuit. The air solenoid 31 will be immediately activated to allow high pressure air to reach the nozzle mixing head 25 and nozzle discharge 25a. After a brief time delay due to resistor R11 the repellent solenoid 23 will open to allow fluid to flow to mixing head 25. The mixture of air and liquid internally at mixing head 25 will produce an extremely fine fluid spray pattern. After the case has passed the generator wheel 46 the repellent solenoid 23 will close immediately and the air solenoid due to capacitor C1 discharging will close slightly thereafter. This arrangement allows all fluid to be completely sprayed by the flowing air such that none will drip from the nozzle 25a.

During spraying if a case should become stalled inside the cabinet 11 the signal from generator 45 will stop immediately and the spray will shut off instantly. When forward movement of the stalled case resumes the spray will likewise immediately resume. The construction of the cabinet 11 and spray circuitry allows continuous spray such that should cases closely follow one another, the spray will continue until the entire line of cases is past.

Should the repellent level drop at any time the conductivity probe 14b will actuate spray indicator light 37 to warn an operator that the tanks 14—14 should be refilled.

The control circuit is also provided with a test button as indicated to allow testing before cases are introduced to the cabinet.

The circuitry as shown in FIG. 4 is substantially comprised of solid state elements to provide a longer lasting trouble free circuit. The voltage of the control circuit is less than 24 volts D.C. which allows the cabinet to be used with safety even though liquid is present. A further refinement of the circuit to insure perfect operation is shown in the branch M-N. This is substantially a filter capacitor which is provided such that stray signals present in the area where the cabinet is installed will not accidentally actuate the circuit.

As the cases pass through the cabinet the spray delivered thereon protects the cases against infestations when the cases are away from the plant. This of course is extremely important to maintain the sanitary conditions existing in the plant.

It should be obvious that applicant has provided a unique spray mechanism actuated by a unique motion sensing unit which is responsive to the movement of articles to be sprayed carried therepast automatically controlling the spray thereupon.

It will, of course, be understood that various changes may be made in the form, details, arrangements and proportion of parts without departing from the scope of my invention, which generally stated consists in the matter set forth in the appended claims.

What I claim is:
1. A spraying apparatus for spraying articles conveyed therepast including:
  (a) a spray nozzle;
  (b) a fluid supply communicating with the nozzle for delivery of fluid under pressure thereto;
  (c) control means controlling the flow of fluid from said supply to said nozzle including electric circuit means responsive to a signal arranged to open and close communication between the fluid supply and the nozzle;
  (d) a sensing device having a rotatable sensing element which element is arranged to frictionally contact an article carried on the conveyor to be rotated as the article is moved therepast; and
  (e) an electric signal generator driven by said rotatable element which signal is transmitted to the electric circuit means of said control means.

2. The structure set forth in claim 1 wherein at least the rotatable element of said sensing device is biased into contacting position with articles moved therepast.

3. A spraying apparatus for spraying articles conveyed therepast including:
  (a) a spray nozzle;
  (b) fluid supply means communicating with said spray nozzle;
  (c) air supply means communicating with said spray nozzle;
  (d) control means controlling the flow of fluid from said fluid supply means to said nozzle and the flow of air from said air supply means to said nozzle including electric circuit means responsive to a signal arranged to open and close communication between the fluid supply means and the nozzle, and the air supply means and the nozzle;
  (e) a sensing device having a rotatable sensing element which element is arranged to frictionally contact an article carried on the conveyor to be rotated as the article is moved therepast;
  (f) an electric signal generator driven by said rotatable element which signal is transmitted to the electric circuit means of said control means; and
  (g) time delay means cooperatively associated with said control means to delay the fluid passage to the nozzle for a predetermined time after air communication to the nozzle has been opened.

4. The structure set forth in claim 3 and a second time delay cooperatively arranged with said control means to close communication between the nozzle and air supply means a predetermined time after communication between the fluid supply and the nozzle has been closed.

5. Structure set forth in claim 3 and air control means directing a portion of the air to the fluid supply means for pressurizing the fluid therein and forcing the same under pressure into communication with said nozzle.

References Cited by the Examiner
UNITED STATES PATENTS

| | | | |
|---|---|---|---|
| 2,654,911 | 10/1953 | Sharlip | 118—2 |
| 2,694,963 | 11/1954 | MacDonald | 118—2 X |
| 3,070,064 | 12/1962 | Busse | 118—2 |
| 3,071,144 | 1/1963 | Hilliker | 134—49 |

DANIEL BLUM, *Primary Examiner.*